United States Patent
Kozloski et al.

(10) Patent No.: US 10,990,888 B2
(45) Date of Patent: Apr. 27, 2021

(54) COGNITIVE MONITORING

(71) Applicant: International Business Machines Corporation, Armonk, NY (US)

(72) Inventors: James R. Kozloski, New Fairfield, CT (US); Clifford A. Pickover, Yorktown Heights, NY (US); Valentina Salapura, Chappaqua, NY (US); Maja Vukovic, New York, NY (US)

(73) Assignee: International Business Machines Corporation, Armonk, NY (US)

(*) Notice: Subject to any disclaimer, the term of this patent is extended or adjusted under 35 U.S.C. 154(b) by 357 days.

(21) Appl. No.: 14/672,452

(22) Filed: Mar. 30, 2015

(65) Prior Publication Data

US 2016/0293024 A1 Oct. 6, 2016

(51) Int. Cl.
| | | |
|---|---|---|
| G09B 21/00 | (2006.01) | |
| G06N 7/00 | (2006.01) | |
| G09B 19/00 | (2006.01) | |
| G06Q 10/10 | (2012.01) | |
| G06N 5/04 | (2006.01) | |

(52) U.S. Cl.
CPC ........... *G06N 7/005* (2013.01); *G06Q 10/109* (2013.01); *G09B 19/00* (2013.01); *G06N 5/046* (2013.01); *G09B 21/007* (2013.01)

(58) Field of Classification Search
USPC ....................................................... 434/236
See application file for complete search history.

(56) References Cited

U.S. PATENT DOCUMENTS

| | | | |
|---|---|---|---|
| 5,662,123 A | 9/1997 | Goldman et al. | |
| 6,167,298 A * | 12/2000 | Levin .................. | A61B 5/0482 600/545 |
| 6,648,822 B2 * | 11/2003 | Hamamoto ........... | G06Q 10/02 128/903 |
| 6,842,877 B2 * | 1/2005 | Robarts .................. | G06F 1/163 700/65 |
| 9,195,067 B1 * | 11/2015 | Heinrich .............. | G02B 27/017 |
| 9,472,207 B2 * | 10/2016 | Gondi .................... | G10L 25/63 |
| 2002/0078204 A1 * | 6/2002 | Newell .................. | G06F 1/163 709/225 |
| 2005/0033122 A1 | 2/2005 | Balkin et al. | |
| 2006/0029198 A1 * | 2/2006 | Dorneich ............. | A61B 5/0002 379/88.22 |

(Continued)

FOREIGN PATENT DOCUMENTS

WO 2014063160 A1 4/2014

OTHER PUBLICATIONS

James R. Kozloski et al., unpublished U.S. Appl. No. 14/986,589 filed Dec. 31, 2015, Cognitive Monitoring, pp. 1-33 and 7 sheets of drawings.

(Continued)

*Primary Examiner* — Michael C Grant
(74) *Attorney, Agent, or Firm* — Anthony Curro; Otterstedt, Wallace & Kammer, LLP

(57) ABSTRACT

A method for operating a cognitive monitor includes measuring a cognitive tone of a user, determining a categorization of the cognitive tone of the user, selecting an effector using the categorization of the cognitive tone of the user, and applying the at least one effector using a feedback mechanism of the cognitive monitor. The effector is selected to achieve a predicted future cognitive tone in the user.

9 Claims, 7 Drawing Sheets

(56) References Cited

U.S. PATENT DOCUMENTS

| | | | | |
|---|---|---|---|---|
| 2007/0165019 | A1* | 7/2007 | Hale | G06Q 10/00 |
| | | | | 345/418 |
| 2007/0192910 | A1* | 8/2007 | Vu | B25J 5/007 |
| | | | | 700/245 |
| 2013/0078600 | A1* | 3/2013 | Fischer | G09B 19/00 |
| | | | | 434/236 |
| 2013/0245396 | A1* | 9/2013 | Berman | G06F 19/3418 |
| | | | | 600/301 |
| 2013/0295963 | A1 | 11/2013 | Sen | |
| 2014/0081090 | A1* | 3/2014 | Picard | G06F 19/3418 |
| | | | | 600/301 |
| 2014/0114889 | A1* | 4/2014 | Dagum | G06F 19/3406 |
| | | | | 706/12 |
| 2014/0139451 | A1* | 5/2014 | Levesque | G06F 3/016 |
| | | | | 345/173 |
| 2014/0234815 | A1* | 8/2014 | Jang | G09B 19/00 |
| | | | | 434/236 |
| 2014/0240122 | A1* | 8/2014 | Roberts | G08B 21/182 |
| | | | | 340/539.11 |
| 2014/0247151 | A1 | 9/2014 | Proud et al. | |
| 2014/0288401 | A1 | 9/2014 | Ouwerkerk et al. | |
| 2015/0118663 | A1* | 4/2015 | Levy | G09B 5/02 |
| | | | | 434/236 |
| 2015/0272511 | A1* | 10/2015 | Najafi | A61B 5/7275 |
| | | | | 600/301 |
| 2015/0298315 | A1* | 10/2015 | Shick | B25J 11/0005 |
| | | | | 700/246 |
| 2015/0335288 | A1* | 11/2015 | Toth | A61B 5/6833 |
| | | | | 600/373 |
| 2015/0373022 | A1* | 12/2015 | Dubman | H04L 63/10 |
| | | | | 726/3 |
| 2016/0293024 | A1* | 10/2016 | Kozloski | G06Q 10/109 |

OTHER PUBLICATIONS

List of IBM Patents or Patent Applications.

Ivorra et al., "Minimally Obtrusive Wearable Device for Continuous Interactive Cognitive and Neurological Assessment", Physiological Measurement, vol. 29, No. 5, pp. 1-14, Apr. 2008.

* cited by examiner

1

COGNITIVE MONITORING

BACKGROUND

The present disclosure relates to assistive technology, and more particularly to a device configured to monitor a user's cognitive tone.

As personal computers have become more popular in everyday life, electronic devices in general have become more important for everyday tasks. In this context, many people desire almost constant access to their computers and other electronic devices, leading to ubiquitous and pervasive computing. Ubiquitous computing is changing and expanding the way users interact with computer devices.

BRIEF SUMMARY

According to an exemplary embodiment of the present invention, a method for operating a cognitive monitor includes measuring a cognitive tone of a user, determining a categorization of the cognitive tone of the user, selecting an effector using the categorization of the cognitive tone of the user, wherein the effector is selected to achieve a predicted future cognitive tone in the user, and applying the at least one effector using a feedback mechanism of the cognitive monitor.

According to an exemplary embodiment of the present invention, a cognitive monitor includes at least one sensor configured to collect data about a current cognitive tone of a user, a processor configured to analyze the data to categorize the current cognitive tone and apply at least one policy defining an action using the analysis of the data to select at least one effector, and a feedback mechanism configured to apply the at least one effector to implement the at least one policy.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
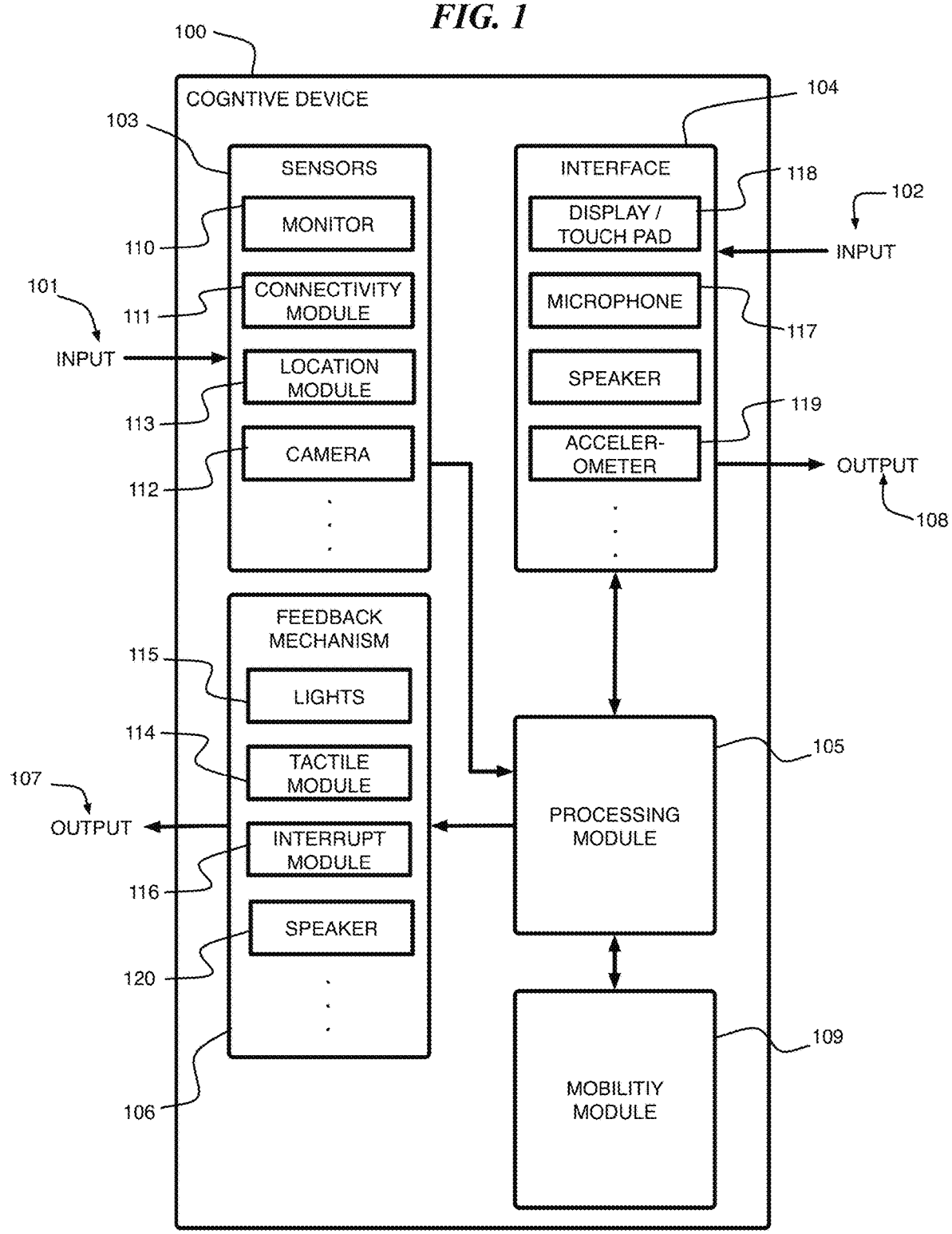
FIG. 1 is a diagram of a cognitive monitor according to an exemplary embodiment of the present invention.

According to an exemplary embodiment of the present invention, a cognitive monitor is a device including one or more sensors for real-time cognitive-related measurement, an interface to a user's data (e.g., to electronic communications and/or calendar data), and a means of providing information or feedback on a current cognitive tone and/or a forecasted cognitive tone of the user. FIG. 1 is a diagram of a cognitive monitor 100 according to an exemplary embodiment of the present invention.

According to an embodiment of the present invention, cognitive tone is a quality of a brain state that is indicative and/or predictive of a change in an individual's behavioral context. Stated another way, cognitive tone refers to one or more cognitive faculties that can be estimated by measures of behavior, performance, speech, etc. These cognitive faculties include perception, attention, memory, motor function, language, visual and spatial processing, executive functions, etc. In at least one embodiment, the cognitive monitor 100 determines and analyzes measurable correlates of brain states and processes that predict (e.g., negative) changes in behavioral context, including those pertaining to performance, risk of injury, inaction, incommunicativeness, and emotional changes and disturbances. In at least one embodiment, the cognitive monitor is configured to detect a drop in cognitive tone.

The cognitive monitor 100 can be embodied in various forms, including a wearable device (e.g., a bracelet, watch, earring, cuff, necklace or hat), electronic companion such as a mobile robot, etc. As illustrated in FIG. 1, the cognitive monitor 100 includes one or more sensors 103, an interface 104, a processing module 105 including a processor and memory, and a feedback mechanism 106.

The cognitive monitor 100 collects input or measurements 101/102 through the sensors 103 and interface 104. The cognitive-related input 101/102 is information sensed or input, in real-time, about the user and/or the user's surroundings. The sensors 103 can include monitors 110 such as a heart rate monitor, a skin conductance monitor, piloerection monitor, respiration monitor, electroencephalography device, optoelectronic monitors of living tissue, etc. In at least one exemplary embodiment, a sensor 103 includes a connectivity module 111 configured to receive/retrieve data from a storage device (e.g., local computer, a cloud server, another cognitive monitor, etc.). The data can include, for example, email and calendar data. According to one or more exemplary embodiments, a sensor 103 is configured to determine the cognitive monitor's location global location) location relative to another entity (e.g., another user), location relative to a structure of interest or service (e.g., Wi-Fi), etc. In one or more embodiments, a cognitive monitor 100 is embodied as a wearable device including a sensor 103 having physical contact with a user and configured to take measurements.

In at least one embodiment of the present invention, an interface 104 of the cognitive device 100 is embodied as a touch sensitive display controlled by the processing module 105 and configured to receive input 102 (e.g., touch based interactions) and output 108 alerts (e.g., display an alert).

According to an embodiment of the present invention, the content of a user's electronic communications (e.g., text, semantics, and imagery of email, short messaging services (SMS), etc.) and/or electronic calendar data is scanned by the processing module 105 to determine a behavioral, cognitive, and/or emotional context of the user. The processing module 105 uses the received data to determine a cognitive tone of the user, and uses the cognitive tone to determine an appropriate output for a given application.

The cognitive tone can be deduced from the semantics of the electronic communication by psycholinguistic analysis, dictionary-based semantic identification, rule-based approaches, and the like. It should be understood that semantic meaning may be attached to words and phrases.

Psycholinguistic analysis determines the emotional, cognitive, and topical properties of an artefact (e.g., written text). For example, Linguistic Inquiry and Word Count (LIWC) is a psycholinguistic technique used in the analysis of texts including emails and blogs. LIWC can be used to capture psychometric properties of the user through analysis of the electronic communications to deduce the cognitive tone of the user.

Methods of dictionary-based semantic identification, such as implemented by the Apache Software Foundation's (ASF) ConceptMapper, use user-specified attributes attached to words and phrases defined in a custom dictionary. These attributes can correspond to different cognitive tones.

In one embodiment of the present disclosure, a rule-based approach is utilized to identify specific cognitive tones within artifacts. In one embodiment, a set of artifacts with identified cognitive tone content may be used for creating a rules engine and custom dictionaries. In one or more embodiments, the rules engine includes predicates that match words, concepts, and attributes, and allow conjunctions and disjunctions of these predicates. The rules in the rules engine combine terms that suggest a cognitive tone (e.g., angry, upset) with words that indicate the target of the emotional state.

According to an embodiment of the present invention, the rules engine identifies predefined categories of cognitive tone in the given artifact using the constructed rules and the extracted features. For example, the rules engine predicts a future cognitive tone that can be expected from the application of one or more effectors, and select an effector using the predicted future cognitive tone. Stated another way, the rules engine considers what outcome is likely from the application of different effectors and selects one or more effectors to achieve a desired outcome for the user (e.g., raise alertness, maintain a current tone, etc.).

According to an embodiment of the present invention, the output 108 and/or feedback 107 includes one or more of a report (audio, pictorial, kinetic (e.g., vibrations), etc.), coloration, or a transfer of information to another device. In one or more embodiments of the present invention, a forecast of the cognitive tone of the user is determined based on an analysis of the user (e.g., an analysis of a current state, upcoming scheduled events, current communications, etc.) projected into the future (e.g., a minute, an hour, a day, etc.).

In an exemplary scenario, the user wears the cognitive monitor 100 and the cognitive monitor 100 determines information about the user's real-time state (e.g., mood, health, etc.) in conjunction with additional information, such as information about a meeting appearing on the user's electronic calendar, along with other meetings scheduled for that day. The processing module 105 assesses the information and makes a determination and forecast about the user's state.

In one or more embodiments, the user enters information through the interface 104 to provide additional information on a current state. The current or forecast state may be stored by the cognitive monitor 100 and/or transferred to another device. The current or forecast state can be displayed by the interface 104 of the cognitive monitor 100. The user may also provide an indication of a perceived cognitive state using the interface 104. The interface 104 can include a keypad, a microphone 117 for voice input, one or more real or virtual buttons (e.g., a touch pad 118), an accelerometer 119, etc. Each interface may be coupled to a data storage device and a communicative coupling to an analytics resource. The analytics resource can be implemented by the cognitive monitor 100 or accessed via a wireless link to the Internet and a cloud computing resource.

In one or more embodiments of the present invention, a cognitive monitor 100 embodied as an electronic companion includes a mobility module 109 configured to move the cognitive monitor 100. For example, the mobility module 109 can be configured to track and follow a user within a premises (e.g., a home or office). In at least one embodiment, the mobility module 109 includes a camera 112 for optically tracking the user and a mechanism for moving the cognitive monitor 100 (e.g., legs, wheels, a cog driving a ball-shaped cognitive monitor by changing a center of gravity of the monitor, a quadrotor helicopter arrangement, etc.).

The cognitive monitor 100 can be embodied in various forms, including a wearable device (e.g., a bracelet, watch, earring, cuff, necklace or hat), electronic companion such as a mobile robot, a vehicle's entertaining system, etc. According to an embodiment of the present invention, as a wearable device, the cognitive device 100 includes a sensor 103 having physical contact with a user and configured to take measurements. According to an embodiment of the present invention, as an electronic companion, the cognitive device 100 includes a routine to prompt a user for physical contact, and a sensor 103 configured to take a measurement during physical contact with the user. In one or more embodiments, the sensor 103 is configured to take remote measurements, not requiring physical contact, such as by monitoring a user's speech.

Figure 2:
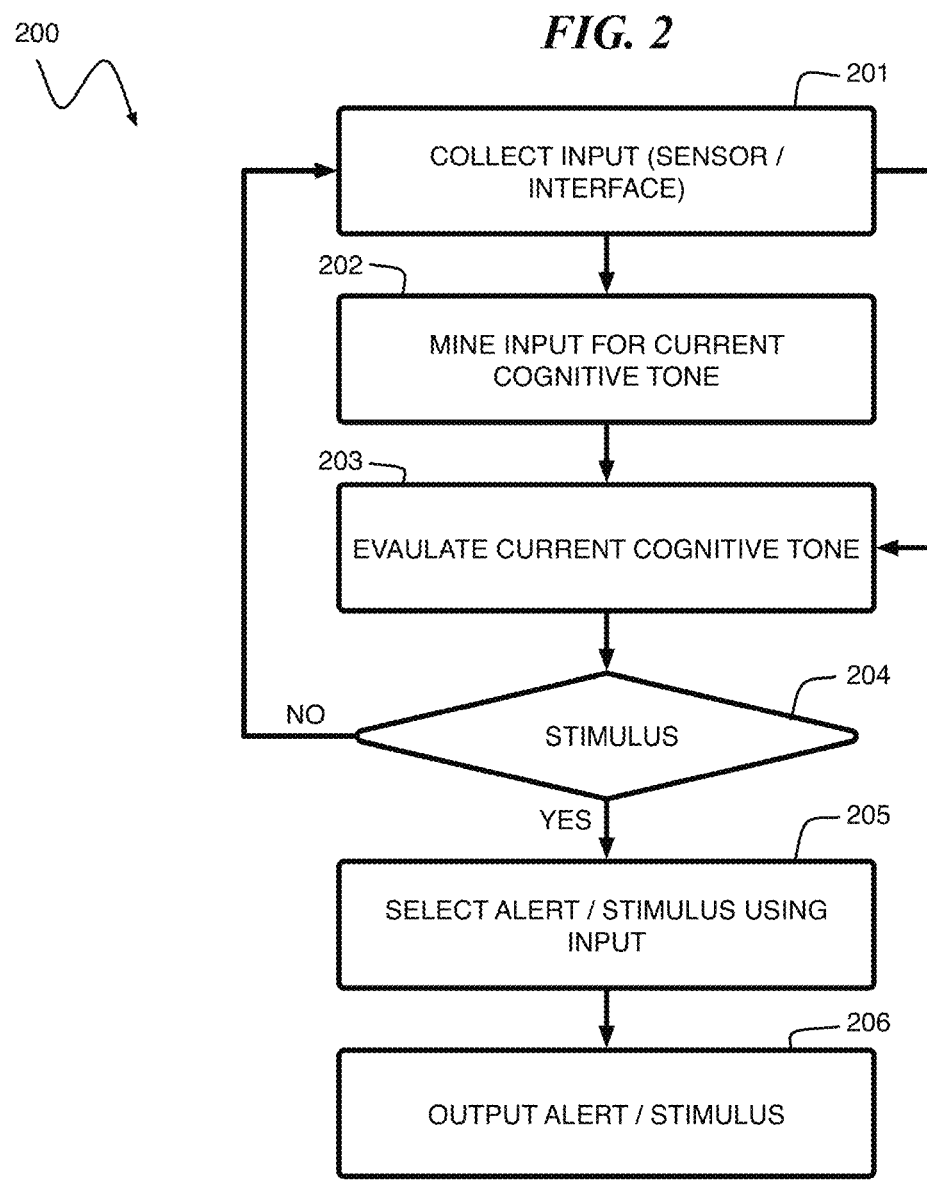
FIG. 2 is a flow diagram of method performed by a cognitive monitor according to an exemplary embodiment of the present invention.

According to one or more embodiments of the present invention, a method 200 performed by the cognitive monitor 100 is shown in FIG. 2. In FIG. 2 input data is collected at 201 and the data is analyzed for a current cognitive tone at 202. In a case where the user inputs his or her own perceived cognitive tone, the method advances to block 203. In either path, the current cognitive tone is evaluated at 203 (e.g., is the current cognitive tone within an expected range). At block 204, if the value of the cognitive tone is not as expected, the cognitive monitor determines whether to select a stimulus. Here, the cognitive monitor may evaluate a current state of the user to determine whether a stimulus would be appropriate at the time (see for example the interrupt feature discussed below). At block 205 a stimulus is selected that is appropriate for the current cognitive tone and/or other state information about the user. At block 206 the selected stimulus is output. The stimulus, discussed below, can include a physically stimulus, a reminder, a prompt to perform a new/different task, etc.

The cognitive monitor 100 is able to help the user control general changes in cognitive tone (see for example, FIG. 3) over a time scale of days by intervention when measurable correlates indicate that intervention is likely to improve a user's cognitive tone. In at least one exemplary embodiment, the measurable correlates include electrical activity measured at the skin surface, but may also include involuntary, autonomic indicators of the brain's modulatory state, as described herein, these can include heart rate, goose bumps, gait and balance, etc. In addition, behavior and performance measures can be indicated.

Exemplary outputs of the cognitive device 100 include audible alerts via speaker 120, interrupts and tactile changes to the device. These outputs can be facilitated by hardware, software and a combination of the same.

In one exemplary embodiment, the cognitive device 100 includes an interrupt module 116 that generates an interrupt related to information available to the cognitive monitor 100. The cognitive monitor 100 is configured to stop an output function (e.g., postpone an audible or visual alert) about a determined cognitive tone using information gleaned from an electronic calendar or schedule information of the user. For example, the cognitive monitor is configured to turn red (e.g., using light emitting diodes 115) based on a certain determined cognitive tone, except where a stopping feature interrupts based on the electronic calendar indicating at the time of a scheduled meeting with a client or employer) that such an alert will be disruptive. In one or more embodiments, an alert is facilitated by information gleaned from a calendar, if for example, a social event is scheduled, and cognitive tone is dropping, the alert (e.g., a squeeze) is facilitated and augmented to caution the user to take action to prepare their cognitive tone for the interaction, such as by turning off a television.

Tactile changes can be facilitated by a tactile module 114, such as an electrorheological (ER) fluid disposed within a band of the cognitive monitor 100, for example, in the case of a wearable wristband, providing a tactile alert or reassurance to the user. In one example, an apparent viscosity of the ER fluid is controlled, in millisecond timeframes, using an electric field applied by the tactile module 114. A change in the apparent viscosity can produce a tactile change. In another example, a magnetorheological fluid (MR fluid) is contained within the cognitive monitor 100. The MR fluid is disposed in a carrier fluid (e.g., an oil). When a magnetic field is applied to the MR fluid, the fluid increases its apparent viscosity and becomes a viscoelastic solid. Similar to the ER fluid, the change in apparent viscosity can produce a tactile change in the cognitive monitor 100 that is perceived by the user. In one or more embodiments of the present invention, the cognitive monitor 100 makes partial forecasts of current or future cognitive tone that can be enhanced. In this embodiment, the cognitive monitor 100 uses knowledge of a user's electronic calendar or schedule (e.g., the topic of a meeting, time of the meeting, nature of people present, a doctor's visit, a school calendar and class times, etc.) to enhance the forecast of a future cognitive tone of the user (e.g., the user is likely to experience a rising cognitive tone under some future condition).

Exemplary embodiments described herein can be implemented to improve the quality of a process in a service industry (e.g., healthcare, education, etc.) that uses context and cognitive input from end-users (e.g., clients) and service providers. For example, one or more cognitive monitors can be deployed to facilitate real-time and granular service quality management based on contextual and cognitive awareness, among individuals (e.g., patients), groups of end-users (e.g., students in a class), etc. Each end-user and service provider has their own cognitive model during the service execution (e.g., healthcare treatment or a lecture). In one or more embodiments, electronic calendars and real-time user feedback are used to enhance inferences. For example, the cognitive monitor 100 can determine a current context of the user from the electronic calendar, predict that the user is in the presence of others and switch from visual alerts to tactile alerts, which may be imperceptible to those in the vicinity of the user (see block 205, FIG. 2).

According to one or more exemplary embodiments, information determined about the user's location (e.g., using a location module 113, FIG. 1) is used to track progress in a task or identify a discrepancy from a schedule (e.g., a deviation from a planned delivery route, flight plan, doctor's visit). This information can be used for user that deviates from a schedule, or to correlate certain emotional states with location and environment.

In a service environment, the cognitive monitor 100 understands a user's cognitive tone and a provider's cognitive disposition or state (e.g., by analyzing the speech of the provider or the electronic communications of the user with the provider). The provider cognitive state is useful to alert the user when a particular context is likely. For example, when an interaction with the provider may be interrupted or degraded by an extended absence of the provider, such as when a next checkup with a healthcare provider is scheduled some number of weeks in the future. In this case, the user may be tasked with monitoring the output of the cognitive device 100. The provider cognitive disposition is accommodated by adjusting alert levels and thresholds. In one or more embodiments, the cognitive monitor 100 includes a combination of physical and virtual sensors that capture parameters about the user. The use of virtual sensors is facilitated by a hidden model of a nonlinear system that can transform certain real world measurements into other virtual measures. For example, a change in heart rate, through a model of the vasculature, can change a virtual measure of blood perfusion rates in the brain, producing a change in a virtual sensor reading. This reading is useful in interpreting measurements from an optoelectronic sensor on the scalp, or in predicting a change in cognitive tone directly (e.g., since blood perfusion changes brain states directly). These parameters can include a level of skin conductivity, pulse, temperature, gait, posture, vocal tone, prosody, and cadence of speech or walk, etc., at a series of points in time.

The cognitive monitor 100 determines a situational context of the user. The situational context can be determined using data including time, who else is in the vicinity of the user (e.g., either actually determined or anticipated based on data) and what actions are being performed. In one example, the cognitive monitor 100 determines that the user is in a hospital receiving a therapeutic treatment. In other examples, the cognitive monitor 100 determines that the user is taking an online course, or in a meeting. Having determined the situational context, the cognitive monitor 100 can use this information for intelligent alerts, etc.

The cognitive monitor 100 includes a means for inputting, by the user, an indication of a perceived cognitive tone. The means for inputting the indication can be a keypad, voice input, tapping on a button, or inputting via a connected input device (e.g., Bluetooth keyboard). In the example of a cognitive monitor 100 embodied as a bracelet, the input is physical, e.g., pressing the bracelet, squeezing the bracelet, moving the bracelet, rubbing the bracelet, etc.

In one or more embodiments, other users provide feedback and an assessment of the user's current cognitive tone or forecasted cognitive tone. These assessments and forecasts can be made directly, or inferred from changes in an observer's cognitive tone. In one example, an adult helps to monitor the cognitive tone of a parent patient. After a telephone call between the patient and adult, the adult's emotional state is monitored to determine if they are relieved or stressed. This information is an example of a change in a cognitive disposition of an observer of the patient, which indicates a likely change in the patient's cognitive tone (for example, confused, unresponsive, depressed, etc.).

Figure 3:
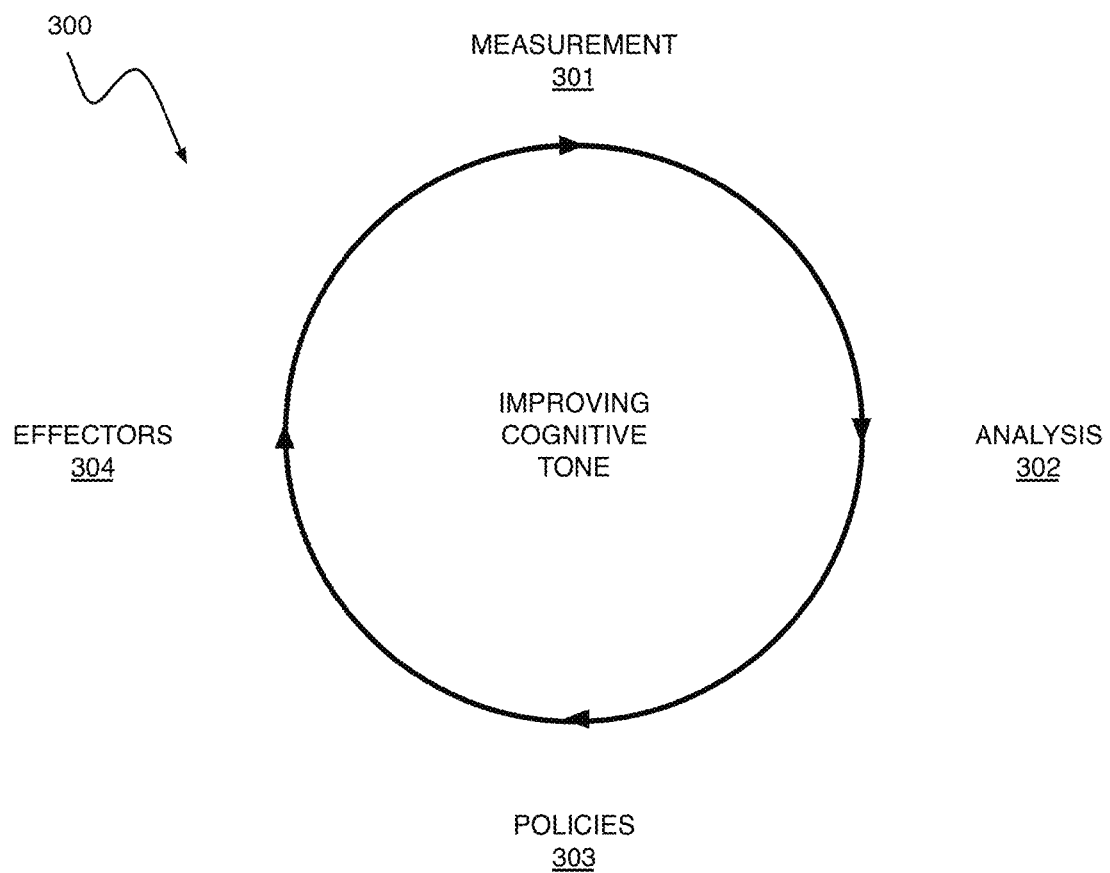
FIG. 3 is a functional diagram of a method for improving cognitive tone according to an exemplary embodiment of the present invention.

The cognitive monitor can understand the relationships between cognitive tones of the end-user and a cognitive state of a service provider, in the context of actions taken, and can learn to respond and improve the overall quality of the service that the client experiences. Referring to FIG. 3, a set of inputs to customer experience include measurement, analysis, policies and effectors, all designed to be improved. This framework for improving cognitive tone includes the measurement or collection of data relating to cognitive tone, an analysis of the data to categorize cognitive tone (e.g., improving or declining, alert, bored, tired), a set of policies defining how to act on the analysis, and an implementation stage where effectors (e.g., alerts, prompts, cognitive training programs, etc.) are output and/or offered to implement the policy. In one or more embodiments, the policies are learned automatically. In at least one embodiment, polices are developed with user input and/or caregiver input.

According to an exemplary embodiment of the present invention, the cognitive monitor has applications in evidence based cognitive stimulation. Rationally targeted stimulation has been shown to be of benefit to those at risk for dementia. The cognitive monitor tracks stimulation loads in a user/patient and promotes a healthy cognitive tone (e.g., as measured and defined within a given range) throughout the day. The determined or predicted cognitive tone is an output of the cognitive monitor. For example, based on a cognitive alert, a message is sent to a caretaker indicating that an interaction with the patient is needed or would be beneficial. In addition, other messaging systems, such as text message or social networking solution could be employed. The alert facilitates maintaining cognitive tone in a person living alone conducive to wellness and self-reliance.

According to an exemplary embodiment of the present invention, a direct stimulation is output by the cognitive monitor to the patient through a network of connected devices in the home, including lighting, media, ambient noise, and providing new task to be completed by the patient. In one or more embodiments, the cognitive monitor includes machine learning functionality to determine the effectiveness for different stimulation, and select appropriate stimulations based on past results (e.g., to maintain a positive cognitive tone). Different stimulations (e.g., direct or indirect) can be selected given a current cognitive context for stimulation.

Consider the example of a patient leaving a hospital and returning home, where he or she is particularly at risk for poor cognitive tone. Upon leaving the hospital, the caregiver responsible for the high-risk patient faces a variety of challenges in providing care. The cognitive monitor can "understand" the role of social interaction and information-sharing to the patient and output appropriate alerts to the caregivers including health professionals.

According to an exemplary embodiment of the present invention, the cognitive monitor employs a reverse correlation. For example, if a patient shows good cognitive tone on a particular day, the cognitive monitor looks back at all activities, phone calls, etc. that preceded that day to determining what interactions facilitated the good outcome. The cognitive monitor than incorporates the information into future determinations.

By way of recapitulation, according to an exemplary embodiment of the present invention, a method for operating a cognitive monitor (see 300, FIG. 3) includes measuring, using at least one sensor of the cognitive monitor, a cognitive tone of a user (see 301, FIG. 3), determining, using at least one processor of the cognitive monitor, a categorization of the cognitive tone of the user (see 302, FIG. 3), selecting an effector, using the at least one processor of the cognitive monitor, using the categorization of the cognitive tone of the user, wherein the effector is selected to achieve a predicted future cognitive tone in the user (see 303, FIG. 3), and applying the at least one effector using a feedback mechanism of the cognitive monitor (see 304, FIG. 3).

According to an exemplary embodiment of the present invention, a cognitive monitor (see 100, FIG. 1) includes at least one sensor (see 103, FIG. 1) configured to collect data about a current cognitive tone of a user, a processor (see 105, FIG. 1) configured to analyze the data to categorize the current cognitive tone and apply at least one policy defining an action using the analysis of the data to select at least one effector, and a feedback mechanism (see 106, FIG. 1) configured to apply the at least one effector to implement the at least one policy.

Exemplary embodiments of the present invention can be implemented for integration with education and healthcare fields, business and home environments, etc. For example, a cognitive monitor can be configured to automatically capture daily activities of students, accompanied by their emotional state during the day. A parent can obtain real-time information about their student and identify potential influencers to the cognitive tone of the student. The cognitive monitor can be configured to automatically generate a cognitive diary for the user. In one or more embodiments, the cognitive monitor is embedded into a room monitor.

In at least one exemplary embodiment of the present invention, in the field of education (e.g., in classroom and/or online—Massive Open Online Course (MOOC)), a user participating in coursework can be monitored for stress corresponding to one or more topics. The cognitive monitor is configured to output recommendations for approaching the material from class. In one or more embodiments, the cognitive monitor is configured to help users with special learning needs (e.g., autism and accessibility challenges). In this case, the cognitive monitor is configured to output data exposing emotions corresponding to tasks and may offer potential approaches based on previous interactions with the user.

In at least one exemplary embodiment of the present invention, in the field of healthcare, a user's cognitive tone is monitored during a physiotherapy session. The cognitive monitor can suggest a schedule of treatment based on the user's predicted cognitive tone.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing cognitive monitor 100 including a processing module 105. Further, a computer program product can include a tangible computer-readable recordable storage medium with code adapted to be executed to carry out one or more method steps described herein, including the provision of the system with the distinct software modules.

Figure 4:
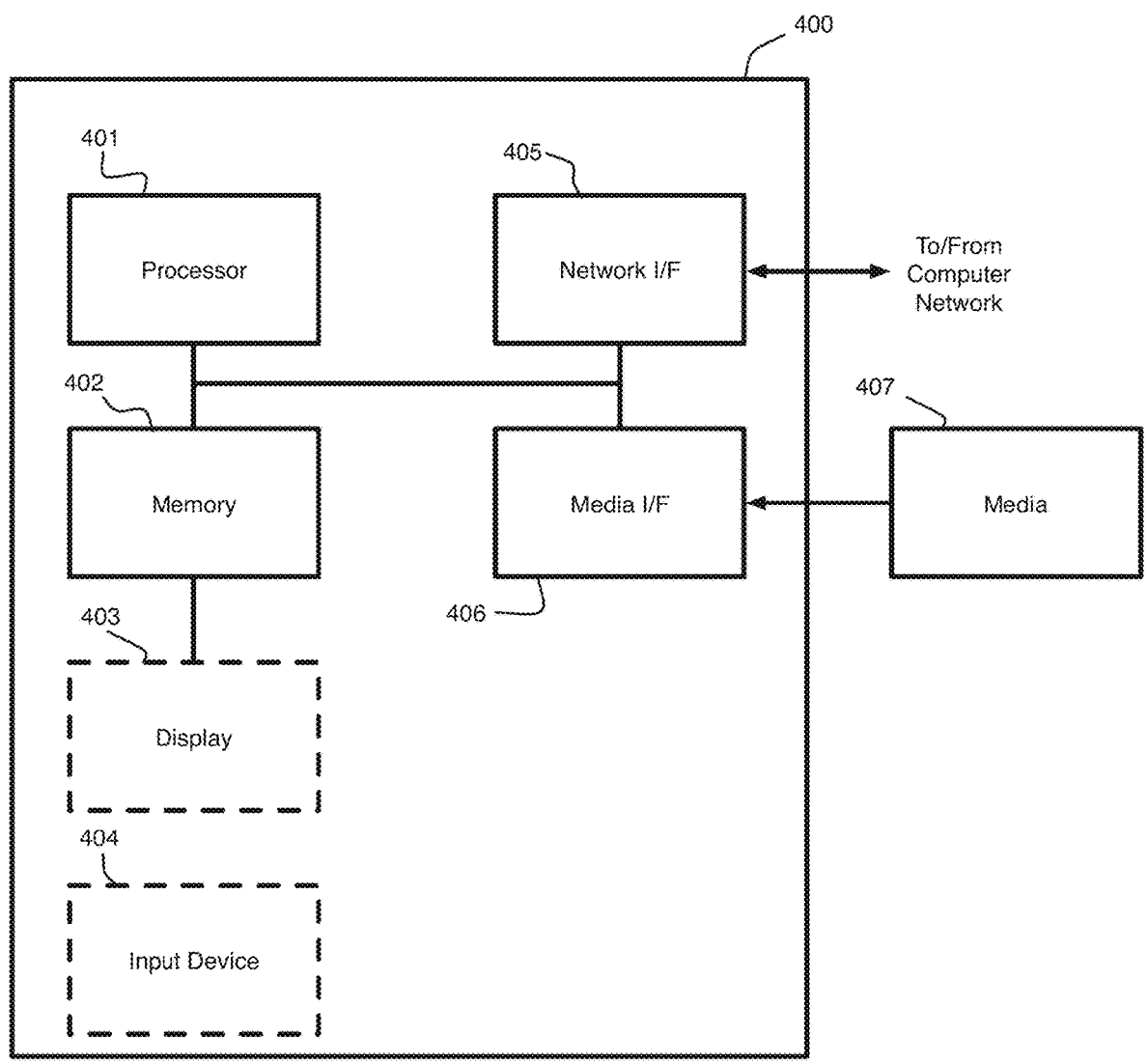
FIG. 4 is a diagram of a computer system configured to perform the operations of a cognitive monitor apparatus according to an exemplary embodiment of the present invention.

Referring to FIG. 4; FIG. 4 is a block diagram depicting an exemplary computer system 400 embodying the cognitive monitor 100 (see FIG. 1) according to an embodiment of the present invention. The computer system shown in FIG. 4 includes a processor 401, memory 402, display 403, input device 404 (e.g., keyboard), a network interface (I/F) 405, a media I/F 406, and media 407, such as a signal source, e.g., camera, Hard Drive (HD), external memory device, etc.

In different applications, some of the components shown in FIG. 4 can be omitted. The whole system shown in FIG. 4 is controlled by computer readable instructions, which are generally stored in the media 407. The software can be downloaded from a network (not shown in the figures), stored in the media 407. Alternatively, software downloaded from a network can be loaded into the memory 402 and executed by the processor 401 so as to complete the function determined by the software.

The processor 401 may be configured to perform one or more methodologies described in the present disclosure, illustrative embodiments of which are shown in the above figures and described herein. Embodiments of the present invention can be implemented as a routine that is stored in memory 402 and executed by the processor 401 to process the signal from the media 407. As such, the computer system is a general-purpose computer system that becomes a specific purpose computer system when executing routines of the present disclosure.

Although the computer system described in FIG. 4 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
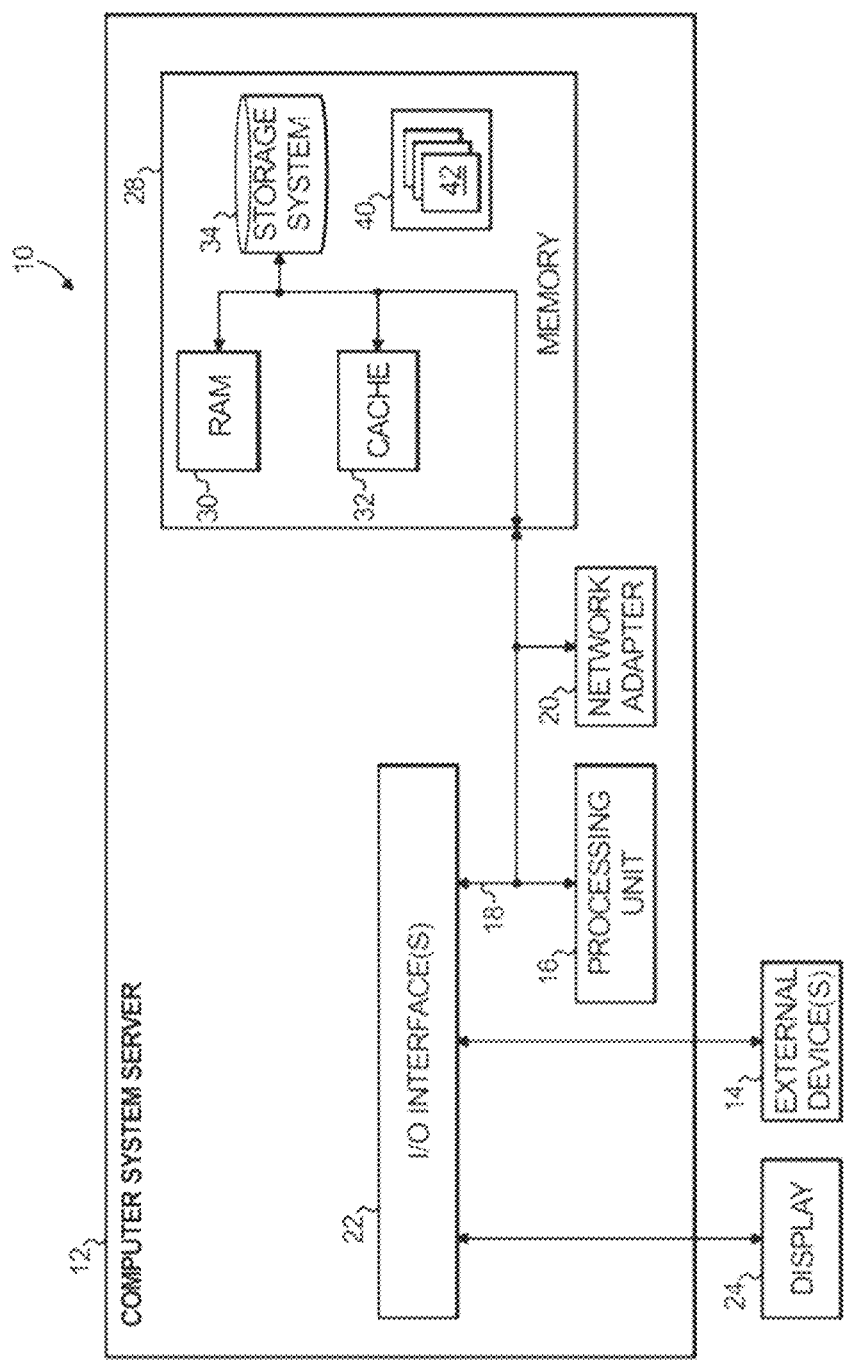
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 6:
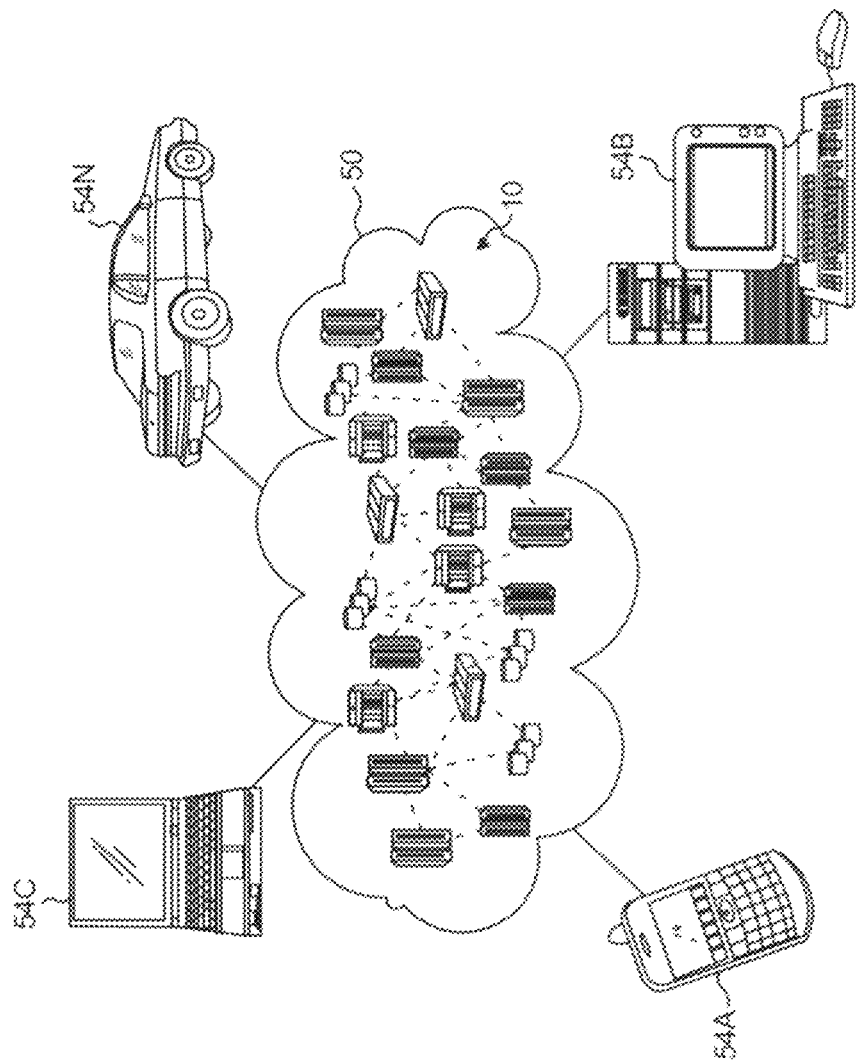
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
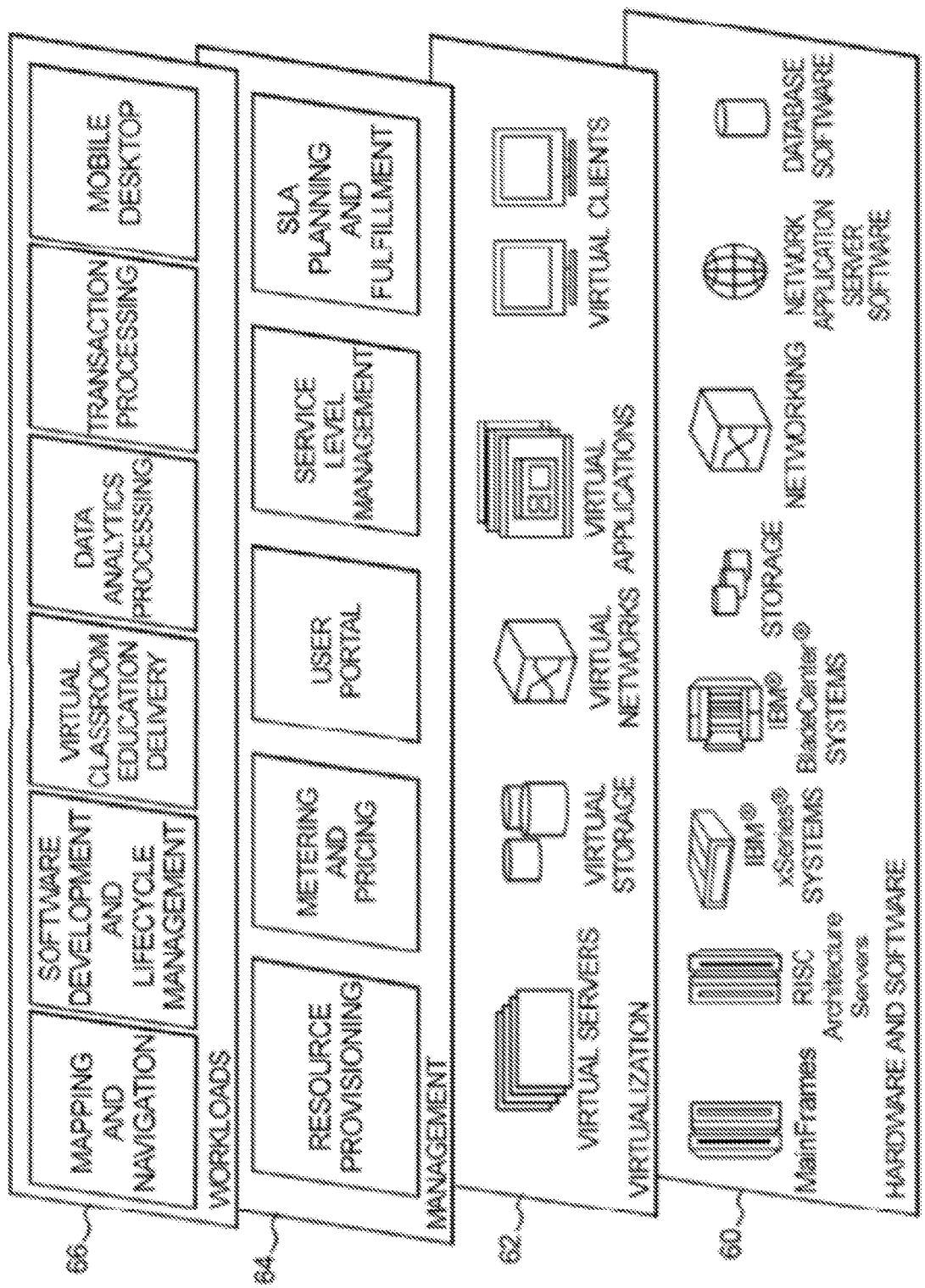
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A cognitive monitor embodied as a wearable device and comprising:
    an electrorheological fluid or a magnetorheological fluid contained in the wearable device;
    a first sensor housed in the wearable device and configured to collect a physiologic measurement indicative of a current cognitive tone of a user by physical contact with the user;
    a second sensor configured to collect an electronic communication indicative of the current cognitive tone of the user; and
    a processor connected in communication with the first sensor to receive the physiologic measurement, connected in communication with the second sensor to receive the electronic communication, configured to determine in real-time a category of the current cognitive tone by analyzing a combination of the physiologic measurement and the electronic communication, according to a rules engine implementing a custom dictionary of terms that suggest a cognitive tone, and configured to impose a haptic effector on the user by activating the electrorheological fluid or the magnetorheological fluid in response to the category of the current cognitive tone,
    wherein the first sensor and the electrorheological or magnetorheological fluid are housed in a wristband of the wearable device, wherein the first sensor is a heart rate monitor and the processor applies a hidden model to obtain from the first sensor a virtual measure of blood perfusion in the brain.

2. The cognitive monitor of claim 1, further comprising an interface configured to receive input and generate output.

3. The cognitive monitor of claim 2, wherein the interface comprises at least one of display, a touch pad, a microphone, a speaker and an accelerometer.

4. The cognitive monitor of claim 2, wherein the processor is configured to implement an interrupt module evaluating a calendar and interrupting the imposition of the haptic effector in response to an event on the calendar.

5. The apparatus of claim 1 wherein the first sensor is a piloerection monitor and the processor correlates piloerection to the brain's modulatory state.

6. A computer program product for operating a cognitive monitor, the computer program product comprising a non-transitory computer readable storage medium having program instructions embodied therewith, the program instructions executable by a processor to cause the processor to:
    receive a physiologic measurement via a sensor housed in a wristband of a wearable device;
    receive an electronic communication;

determine in real-time a category of a current cognitive tone of a user by analyzing a combination of the physiologic measurement and the electronic communication, according to a rules engine implementing a custom dictionary of terms that suggest a cognitive tone; and impose a haptic effector on the user by activating an electrorheological fluid or a magnetorheological fluid in the wristband of the wearable device, in response to the category of the current cognitive tone, wherein the physiologic measurement is heart rate and determining in real time the category of the current cognitive tone includes applying a hidden model to obtain from the heart rate a virtual measure of blood perfusion in the brain.

7. The computer readable medium of claim 6, the program instructions including further instructions executable by the processor to cause the processor to evaluate a calendar and interrupt the imposition of the haptic effector in response to an event on the calendar.

8. A method comprising:

receiving a physiologic measurement via a sensor housed in a wristband of a wearable device;

receiving an electronic communication;

determining in real-time a category of a current cognitive tone of a user by analyzing a combination of the physiologic measurement and the electronic communication, according to a rules engine implementing a custom dictionary of terms that suggest a cognitive tone; and imposing a haptic effector on the user by activating an electrorheological fluid or a magnetorheological fluid in a wristband of the wearable device, in response to the category of the current cognitive tone, wherein the physiologic measurement is heart rate and determining in real time the category of the current cognitive tone includes applying a hidden model to obtain from the heart rate a virtual measure of blood perfusion in the brain.

9. The method of claim 8, further comprising:

evaluating a calendar; and interrupting the imposition of the haptic effector in response to an event on the calendar.

\* \* \* \* \*